US010791506B2

(12) United States Patent
Roskind et al.

(10) Patent No.: US 10,791,506 B2
(45) Date of Patent: Sep. 29, 2020

(54) ADAPTIVE OWNERSHIP AND CLOUD-BASED CONFIGURATION AND CONTROL OF NETWORK DEVICES

(71) Applicant: Google LLC, Mountain View, CA (US)

(72) Inventors: James Roskind, Redwood City, CA (US); Wan-Teh Chang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/259,248

(22) Filed: Jan. 28, 2019

(65) Prior Publication Data

US 2019/0159113 A1  May 23, 2019

Related U.S. Application Data

(62) Division of application No. 15/289,873, filed on Oct. 10, 2016, now Pat. No. 10,477,463, which is a
(Continued)

(51) Int. Cl.
*H04W 48/16* (2009.01)
*H04L 29/08* (2006.01)
(Continued)

(52) U.S. Cl.
CPC .......... *H04W 48/16* (2013.01); *G06F 9/5072* (2013.01); *G06F 9/5077* (2013.01); *G06F 21/604* (2013.01); *H04L 67/10* (2013.01); *H04L 67/34* (2013.01); *H04W 12/06* (2013.01); *H04W 84/12* (2013.01); *H04W 88/16* (2013.01)

(58) Field of Classification Search
None
See application file for complete search history.

(56) References Cited

U.S. PATENT DOCUMENTS 7,617,317 B2  11/2009  Jones et al.
7,734,283 B2   6/2010  Sebban
(Continued)

OTHER PUBLICATIONS

"Final Office Action", U.S. Appl. No. 13/460,707, dated Oct. 8, 2015, 14 pages.
(Continued)

*Primary Examiner* — Lonnie V Sweet
(74) *Attorney, Agent, or Firm* — Colby Nipper PLLC

(57) ABSTRACT

Methods, systems, and computer program products for cloud-based adaptive configuration and control of a network device include, detecting an access by a user through the network device to a cloud-based service; and responsive to the detected access, configuring the network device to be controlled by the user via a cloud-based configuration controller. Further implementations include, receiving a configuration request from the network device, wherein the configuration request includes access information pertaining to an access made by a user to a cloud-based service; determining a cloud-based identity of the user based upon the received access information; associating the cloud-based identity with an ownership identifier; forming one or more instructions to configure the network device with the ownership identifier as an owner of the network device; and transmitting the one or more instructions to the network device.

20 Claims, 10 Drawing Sheets

Related U.S. Application Data division of application No. 13/460,707, filed on Apr. 30, 2012, now Pat. No. 9,465,668.

(51) Int. Cl.

| | | |
|---|---|---|
| *G06F 9/50* | (2006.01) | |
| *H04W 84/12* | (2009.01) | |
| *H04W 88/16* | (2009.01) | |
| *H04W 12/06* | (2009.01) | |
| *G06F 21/60* | (2013.01) | |

(56) References Cited

U.S. PATENT DOCUMENTS

| | | |
|---|---|---|
| 7,899,019 B1 | 3/2011 | Evans et al. |
| 7,924,780 B2 | 4/2011 | Waisman-Diamond |
| 8,190,757 B1 | 5/2012 | Davis et al. |
| 8,472,371 B1 | 6/2013 | Bari et al. |
| 8,478,233 B2 | 7/2013 | Liu et al. |
| 8,819,799 B2 * | 8/2014 | Oguma .................. G06F 21/41 726/8 |
| 8,887,289 B1 | 11/2014 | Hullale |
| 10,477,463 B2 | 11/2019 | Chang et al. |
| 2003/0050976 A1 | 3/2003 | Block et al. |
| 2004/0152463 A1 | 8/2004 | Grootwassink |
| 2005/0059396 A1 | 3/2005 | Chuah et al. |
| 2006/0161771 A1 | 7/2006 | Zhang |
| 2006/0262752 A1 | 11/2006 | Moore et al. |
| 2007/0226499 A1 | 9/2007 | Zhang |
| 2008/0232272 A1 | 9/2008 | Gelbman et al. |
| 2009/0125521 A1 | 5/2009 | Petty |
| 2009/0323636 A1 | 12/2009 | Dillon et al. |
| 2010/0062791 A1 | 3/2010 | Wang et al. |
| 2011/0019607 A1 | 1/2011 | Beck et al. |
| 2011/0154447 A1 | 6/2011 | Dennis et al. |
| 2011/0167478 A1 | 7/2011 | Krishnaswamy et al. |
| 2011/0214176 A1 * | 9/2011 | Burch .................. G06F 9/45533 726/15 |
| 2012/0087315 A1 | 4/2012 | Sivaprakasam |
| 2012/0110643 A1 | 5/2012 | Schmidt et al. |
| 2012/0167180 A1 * | 6/2012 | Lee .......................... G06F 21/31 726/4 |
| 2012/0173356 A1 * | 7/2012 | Fan ...................... G06Q 10/101 705/26.1 |
| 2012/0240197 A1 | 9/2012 | Tran et al. |
| 2012/0251082 A1 | 10/2012 | De Vos et al. |
| 2012/0271660 A1 | 10/2012 | Harris et al. |
| 2012/0311691 A1 | 12/2012 | Karlin et al. |
| 2013/0117806 A1 | 5/2013 | Parthasarathy et al. |
| 2017/0026902 A1 | 1/2017 | Roskind et al. |

OTHER PUBLICATIONS

"Final Office Action", U.S. Appl. No. 15/289,873, dated Dec. 3, 2018, 19 pages.

"Non-Final Office Action", U.S. Appl. No. 13/460,707, dated Apr. 1, 2015, 13 pages.

"Non-Final Office Action", U.S. Appl. No. 15/289,873, dated Jun. 1, 2018, 22 pages.

"Notice of Allowance", U.S. Appl. No. 13/460,707, dated Jun. 13, 2016, 5 pages.

"Restriction Requirement", U.S. Appl. No. 13/460,707, dated Jan. 7, 2015, 5 pages.

"Non-Final Office Action", U.S. Appl. No. 15/289,873, dated Mar. 22, 2019, 21 pages.

"Notice of Allowance", U.S. Appl. No. 15/289,873, dated Aug. 19, 2019, 7 Pages.

\* cited by examiner

ADAPTIVE OWNERSHIP AND CLOUD-BASED CONFIGURATION AND CONTROL OF NETWORK DEVICES

CROSS-REFERENCE TO RELATED APPLICATIONS

This application is a divisional application claiming priority under 35 U.S.C. § 120 to U.S. patent application Ser. No. 15/289,873, filed Oct. 10, 2016, which claims priority under 35 U.S.C. § 120 to U.S. patent application Ser. No. 13/460,707, entitled "Adaptive Ownership and Cloud-Based Configuration and Control of Network Devices" and filed on Apr. 30, 2012, the disclosure of which is hereby incorporated by reference in its entirety for all purposes.

FIELD

This disclosure relates generally to configuration of network devices.

BACKGROUND

Network gateways, such as WIFI routers, are now found in many households. Network gateways used in personal environments, such as homes, are becoming increasingly sophisticated. Home network gateways provide WIFI and other network connectivity to nearby users (e.g., users located within the range of a home WIFI or Bluetooth network, and users connected to another type of home local area network) and implement firewall and monitoring policies. The complexity of network gateways continues to grow as their capabilities and the number of devices to which they provide network access keeps growing.

Users who own these network gateways have varied levels of skill with respect to controlling these devices, and often do not have the knowledge and/or the inclination to perform the recommended setup for the devices. Improper configuration or management of these gateways can lead to poor user experiences, poor quality of service of the various network services made available through the gateway, and security and other risks associated with unauthorized access to the gateway or the associated network connections.

Typically, an owner of a network gateway would be prompted for a login identifier and password when attempting to access or configure the gateway. Owners often use different login identifiers and passwords for each device and service that requires the input of such authenticating information. Having many such different login identifiers and passwords that must somehow be recalled when access is needed to devices or services may be a burden upon the owners.

The burdens placed upon the owner to configure and manage the gateway can result in inconvenience to the owner, as well as lead to poor performance of network services and security risks due to improper configuration. Therefore, it is desired to provide for the configuration and control of network gateways in more user-friendly and more reliable ways.

SUMMARY

Methods, systems, and computer program products for cloud-based adaptive configuration and control of a network device are disclosed. These include detecting an access by a user through the network device to a cloud-based service; and responsive to the detected access, configuring the network device to be controlled by the user via a cloud-based configuration controller.

Other implementations include, receiving a configuration request from the network device, wherein the configuration request includes access information pertaining to an access made by a user to a cloud-based service; determining a cloud-based identity of the user based upon the received access information; associating the cloud-based identity with an ownership identifier; forming one or more instructions to configure the network device with the ownership identifier as an owner of the network device; and transmitting the one or more instructions to the network device.

Further features and advantages of the implementations, as well as the structure and operation of various implementations thereof, are described in detail below with reference to the accompanying drawings. It is noted that this disclosure is not limited to the specific implementations described herein. Such implementations are presented herein for illustrative purposes only. Additional implementations will be apparent to persons skilled in the relevant art(s) based on the teachings contained in this disclosure.

BRIEF DESCRIPTION OF THE DRAWINGS

Reference will be made to implementations, examples of which may be illustrated in the accompanying figures. These figures are intended to be illustrative, not limiting. Although the invention is generally described in the context of these implementations, it should be understood that it is not intended to limit the scope of the disclosure to these particular implementations.

DETAILED DESCRIPTION

While the disclosure refers to illustrative implementations for particular applications, it should be understood that the disclosure is not limited thereto. Those skilled in the art with access to this disclosure will recognize additional modifications, applications, and implementations within the scope of this disclosure and additional fields in which the disclosed examples could be applied.

Implementations disclosed herein may be used in cloud-based adaptive configuration and control of network devices. The controlled network devices can include, but are not limited to, network gateways such as home network gateways and wireless routers. According to some implementations, an authenticated cloud-based identity of a user is automatically associated with the ownership of a network device in the user's home, and thereby the user is allowed to control the network device using the cloud-based identity. By enabling the user to use the same authentication to access one or more cloud-based application services and the network device, a more convenient and reliable configuration of the network device is provided. In an implementation, the user's cloud-based identity is automatically associated with the ownership of a network device, thereby reducing the amount of configuration that must be done by the user. Moreover, by associating a cloud-based identity with the ownership and control of the network device, functions such as reliable authentication of access and delegation of control of the network device are enabled. In some instances, a user may choose to manually configure the network device, for example, as conventionally done, without associating the user's cloud-based identity with the network device.

The term "cloud-based" is used in relation to a service, resource, or data item to indicate that the service, resource, or data item can be provided by a cloud computing device, such as, but not limited, to one or more servers or other computing resources accessible via one or more networks.

Figure 1:
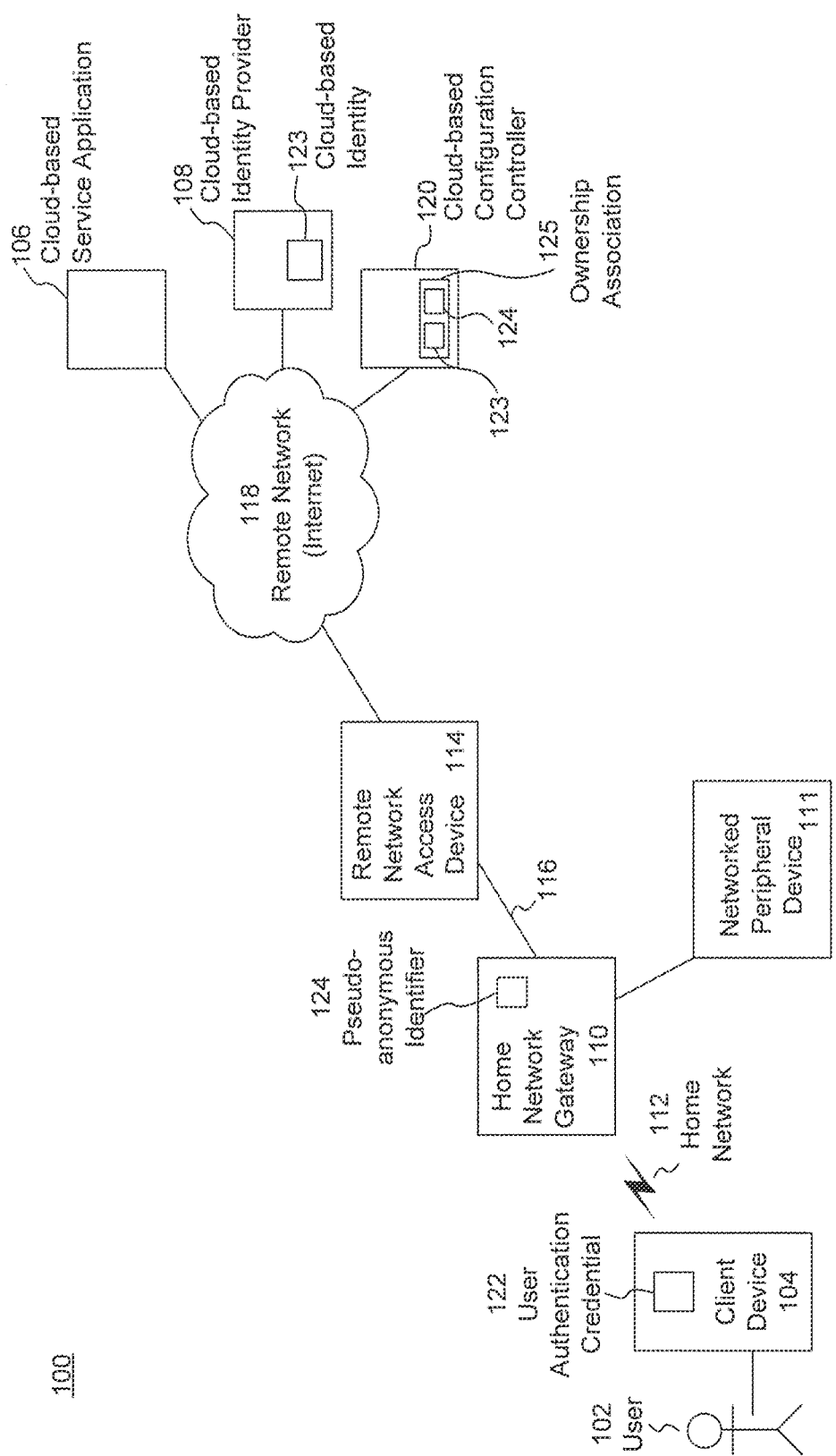
FIG. 1 illustrates a system for cloud-based adaptive configuration and control of network devices, according to an implementation.

FIG. 1 illustrates a system 100 for cloud-based adaptive configuration and control of network devices, according to an implementation. System 100 comprises a client device 104, cloud-based service application 106, cloud-based identity provider 108, a network gateway 110, one or more networked peripheral devices 111, internet access device 114, and a cloud-based configuration controller 120.

A user 102 accesses a cloud-based service application 106 using client device 104. Client device 104 connects to remote network 118 through a network gateway 110, which may not have completed configuration prior to the access by user 102. Cloud-based identity provider 108 authenticates the access by user 102 to cloud-based service application 106. Network gateway 110 automatically detects the authentication activity by cloud-based service application 106. Network gateway 110 may request an ownership configuration from cloud-based identity provider 108 and/or configuration controller 120. Cloud-based identity provider 108 and/or configuration controller 120 then determines an authenticated identity for user 102. According to an implementation, the determined authenticated identity for user 102 may be a pseudo-anonymous identifier 124 that is associated with cloud-based identity 123 of user 102. Cloud-based identity provider 108 and/or configuration controller 120 then responds to network gateway 110 with an ownership configuration. Network gateway 110 is configured to associate its ownership with the authenticated identity of user 102 included in the received ownership configuration.

The term "owner" is used herein to refer to the person or entity that owns the network gateway. The network gateway itself may not be aware of the actual identity of its owner, and may only be aware of an authenticated identity (possibly pseudo-anonymous) generated by a cloud-based identity provider. The owner is provided with authenticated access to that network gateway and is authorized to perform administrative operations. Administrative operations may include configuring network interfaces, configuring access to the network to other users, configuring firewall rules, configuring address assignments, and the like. There may be one or more users, including the owner, who are authorized to perform administrative operations on the network device. Such users are referred to herein as "privileged users."

Client device 104 can be any computing device (e.g., server, personal computer, laptop computer, netbook computer, tablet computer, personal digital assistant), a smart phone, MP3 player, set top box, or other device using which the user can initiate an access to a remote network 118, such as the Internet.

Cloud-based service application 106 can be any application which requires authentication for access. Web-based email provider applications (e.g., GMAIL, YAHOO MAIL) and web-based personal portals (e.g., IGOOGLE, MY YAHOO) are examples of cloud-based service application 106. Cloud-based service application 106 requires that the user is authenticated, for example, by providing a user identifier and a password, in order for the user to be allowed access to the provided service. For example, user 102 may use user credentials 122 (e.g., user identifier and password) to log in to a web-based email service. Cloud-based service application 106 may be implemented on one or more servers and connected to remote network 118.

Cloud-based identity provider 108 provides a cloud-based identity for registered users. A user, such as user 102, may have a pre-existing cloud-based identity 123 provided by cloud-based identity provider 108. When user 102 attempts to access a service, such as cloud-based service application 106, cloud-based identity provider 108 may authenticate user 102 based on user credentials 122 that are provided. When authenticated by cloud-based identity provider 108, the logged in user 102 is represented in system 100 as cloud-based identity 123. Exemplary cloud-based identity providers include Google, Yahoo, Microsoft, United States Post Office, Credit Card Companies, email service providers, financial institutions and the like that provide identity and authentication of users for many cloud-based applications.

Network gateway 110 provides an interface (not shown) to local network 112 through which clients, such as client device 104, and other user devices, such as networked peripheral devices 111, connect to a remote network 118 and/or to each other. Networked peripheral devices 111 can include one or more computers, entertainment platforms, communications platforms, printers, storage devices, household appliances, or other network-connected devices. Local network 112 may include one or more of WIFI, Bluetooth, Ethernet, or other wireless or wireless local area network (LAN). Network gateway 110 may include one or more interfaces (not shown) to local networks such as network 112. Network gateway 110 forwards packets to and from devices on the local networks towards one or more remote networks (e.g., network 118). Network gateway 110 provides a primary point of control of a user's connectivity to networks, such as network 118. In addition to providing local area network connectivity (e.g., wireless access point) and forwarding packets to/from devices on the local area network 112, network gateway 110 may implement firewalls for intrusion detection and to allow or to deny connections to or from any of the devices, such as device 111, on local area network 112. Network gateway 110 can also implement capabilities to authorize and/or enable remote access to any of the peripheral devices, such as 111, in local network 112. Network gateway 110 may also implement Quality of Service (QOS) restrictions, such as restricting bandwidth use to various clients, to degrade or enhance access to devices 111 or 114. QOS restrictions may include, in the extreme, complete blocking of transmission, or complete unfettered access at maximal bandwidth, or any rate in between.

Network gateway 110 may be directly coupled to the remote network 118 (through a provider network) or it may be indirectly connected via a network link 116 to a separate remote network access device 114 (e.g., digital subscriber line (DSL) modem, cable modem) which in turn connects to remote network 118. Network gateway 110 can include access to remote network 118 through a third or fourth generation (3G or 4G) wireless network.

One or more of the implementations are directed at providing configuration, such as ownership to network gateway 110, and at controlling network gateway 110 through a cloud-based service such as cloud-based configuration controller 120.

Cloud-based configuration controller 120 operates to enable user 102 to setup, control and manage devices including network gateway 110. Cloud-based configuration controller 120 can establish an association between a cloud-based identity, such as cloud-based identity 123, of user 102 and an ownership identifier 124 of network gateway 110. Network gateway 110 can be configured by setting up a pseudo-anonymous identifier as the identifier of its owner. Ownership identifier 124, for example, may be a pseudo-anonymous identifier which has no relationship, other than an association, such as ownership association 125, maintained by cloud-based device configuration controller 120 to an identity of a user, such as user 102. Subsequently, cloud-based configuration controller 120 enables user 102 to control and manage network gateway 110 by logging in using the same credentials that the user 102 uses for other cloud-based service applications, such as service application 106.

Figure 2:
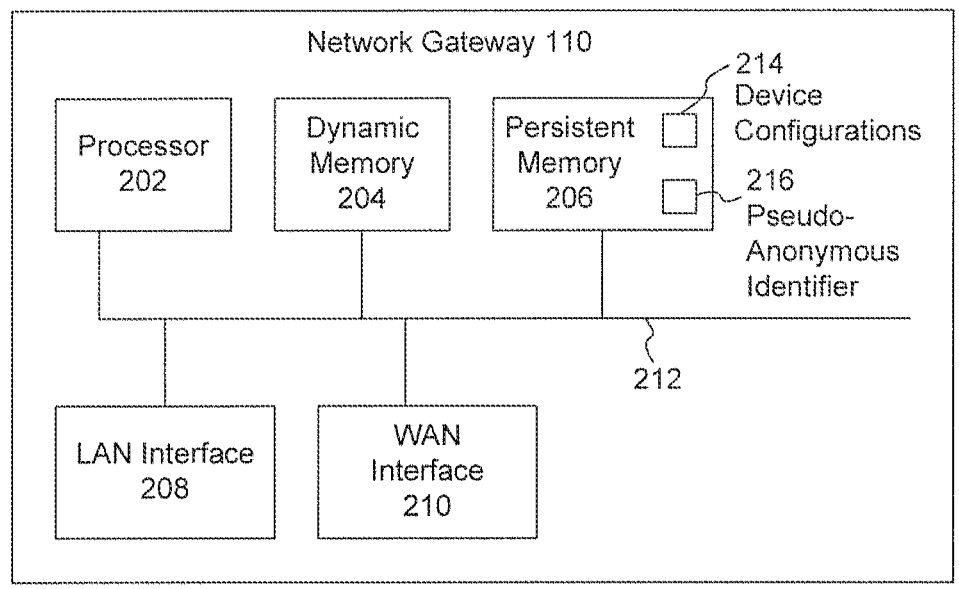
FIG. 2 illustrates a block diagram of a network device in accordance with an implementation.

FIG. 2 illustrates a block diagram of a network gateway device 110 in accordance with an implementation. Network gateway 110 includes a processor 202, a volatile memory 204, a persistent memory 206, one or more local area network (LAN) interfaces 208, one or more wide area network (WAN) interfaces 210, and an interconnection infrastructure 212. Processor 202 can be a processor, such as, but not limited to, a microprocessor, field programmable gate array (FPGA), or digital signal processor (DSP). Volatile memory 204 can include a random access memory (RAM) or like memory. Persistent memory 206 can include a persistent data storage medium such as a hard-disk or flash-memory storage device. Device configurations 214, which include configuration parameters of network gateway 110, may be stored in persistent memory 206. Ownership configuration 216 of network gateway 110 may also be stored in persistent memory 206. Communications infrastructure 212 operates to communicatively couple modules of network device 110. According to an implementation, communications infrastructure comprises at least one communications bus.

LAN interface 208 communicatively couples client devices (such as client device 104 through which user 102 accesses remote network 118), various input/output devices, computing and/or entertainment platforms, and the like, to network gateway 110. For example, client device 104 may be coupled to home network 112 and to through local network interface 208. LAN interface 208 can comprise one or more interfaces to wired or wireless networks such as Wi-Fi, Bluetooth, or Ethernet network.

WAN interface 210 operates to provide connectivity to a remote network 118 to network gateway 110 and to any device connected to network gateway 110 through LAN interface 208. According to an implementation, WAN interface 210 is directly connected to a provider network (not shown) through which remote network 118 is reached. In another implementation WAN interface 210 is connected to an internet access device or provider network access device, such as network access device 114, which is in turn connected to remote network 118.

Figure 3:
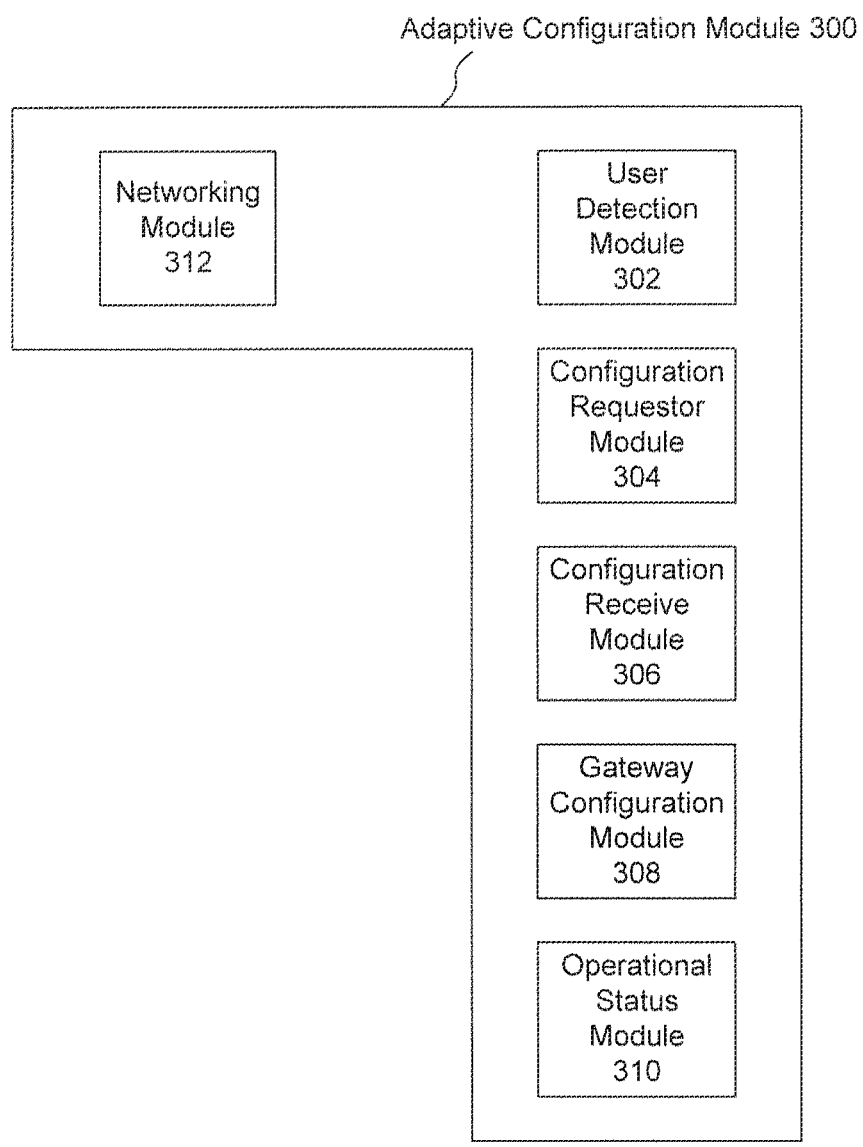
FIG. 3 illustrates an adaptive configuration module that can be implemented in a network device in accordance with an implementation.

FIG. 3 illustrates an adaptive network gateway configuration module 300 that can be implemented in a network gateway in accordance with an implementation. Adaptive network gateway configuration module 300 comprises a user detection module 302, a configuration requester module 304, a configuration receiver module 306, a gateway configuration module 308, and an operational status module 310. Processor 202 of network gateway 110 can, for example, execute adaptive network gateway configuration module 300. In implementations, adaptive network gateway configuration module 300 can be implemented in software, firmware, hardware, or a combination thereof.

User detection module 302 operates to detect the presence of a user nearby the network gateway. Network gateway 110 may detect user 102 or client device 104 based upon, for example, detecting user 102 or client device 104 over local area network 112. For example, the establishment of a physical layer and/or link layer connection between LAN interface 208 and client device 104 may be interpreted as the detection of a nearby user. In WIFI and Bluetooth networks, for example, a connection between nodes is established prior to network layer packets being transmitted. In another implementation, a user may be detected based upon the detection of a new address in the local area network 112. For example, when local area network 112 is an Ethernet, the presence of client device 104 on the Ethernet 112 can be detected based upon the detection of a new physical layer or MAC layer address in that network. According to another implementation, a nearby client device 104 can be detected by network gateway 110 based upon requests for network layer addresses. For example, when network gateway 110 is implementing a dynamic host configuration protocol (DHCP) server (not shown), client device 114 would request an Internet Protocol (IP) address for its use from network gateway 110.

Moreover, user detection module 302 can operate to detect a connection by user 102 and/or client device 104 to a cloud-based application service 106 through network gateway 110. For example, user detection module 302 can monitor communications from client device 104 to a cloud-based service application for which an address has been configured in network gateway 110. Device configurations 214, for example, can include one or more addresses of cloud-based application services for which communications through network gateway 110 can be monitored. According to an implementation, the monitoring may be based upon detecting HTTP protocol messages to the uniform resource locators (URLs) of the servers providing the respective cloud-based service applications.

User detection module 302 can further operate to detect a login and/or other authentication of user 102 by cloud-based service application 106. User detection module 302 can detect login events and/or other authentication events by user 102 and/or client 104 based on any of several techniques. According to one implementation, the traffic between client 104 and cloud-based server application 106 can be monitored for HTTP authentication requests and HTTP response messages indicating successful authentication. Detection based upon plaintext HTTP may be performed, for example, when encryption is not being used for exchanges from the client 104 to cloud-based service application 106, or when a web proxy (not shown) is implemented in network gateway device 110 where the web proxy intercepts the packets from client 104 to cloud-based service application 106. According to another implementation, the setup of a HTTP secure socket layer (SSL) connection or other HTTPS (secure HTTP) may be detected by user detection module 302 as a login or other authentication of the user by cloud-based service application 106.

In another implementation, user detection module 302 may operate to request client 104 for one or more user credentials. For example, upon detection of a connection through network gateway 110 from client 104 to cloud-based service application 106, user detection module 302 may request and receive one or more user credentials from client 104. The request may be implemented, for example, via an HTTP proxy at network gateway 110.

The above described techniques for detecting a connection through network gateway 110 by a user 102 or client 104, and techniques for detecting login or authentication of user 102, are exemplary, and a person skilled in the art would appreciate that many other techniques may be used for such detection.

Configuration requester module 304 operates to request configuration for network gateway 110 from a cloud-based configuration controller. According to an implementation, configuration requester module 304 determines that network gateway 110 requires configuration, and creates a configuration request message (not shown) to be sent to cloud-based configuration controller 120. The configuration request message includes information based on which a cloud-based identity provider 108 can find a cloud-based identity of user 102. For example, in one implementation, the configuration request message can include one or more user login credentials that user 102 provided in order to login to cloud-based service application 106.

According to another implementation, the configuration request message includes an identifier, such as a pubic IP address (Internet Protocol address) of the network gateway 110, by which cloud-based identity provider 108 and cloud-based service application 106 can relate network gateway 110 to a recent authentication by user 102. For example, where network 112 is not a network in which public IP addresses are used, a request for authentication which is originated by client device 104 and received at cloud-based service application 106 would have a unique stream identifier. For example, the stream identifier could be the public IP address and port of network gateway 110 as its source (and associated IP/port pair for terminating at cloud based identity provider 108). As a second example, the stream identifier could be a stream sequence number within a transport protocol, such as the SPDY protocol, when home network gateway 110 is reverse-proxying streams (e.g., multiplexing streams, or tunneling streams) to cloud based service application 106 or cloud based identity provider 108. According to an implementation, the unique stream identifier associated with the request for authentication received from client device 104 (i.e. client device associated with user 102) can be matched to the unique stream identifier as used in a configuration request. Matching may for example consist of matching public IP addresses of home network gateway 110, or matching use of a specific transport tunnel terminating at home network gateway 110. If a match exists, cloud based identity provider 108 may indicate authentication is complete for a pseudo-anonymous identifier 124. That pseudo-anonymous identifier 124 and user is associated with the network gateway 110, which in turn enables relating a cloud-based identity of the user to the ownership of network gateway 110.

According to yet another implementation, network gateway 110 can detect a request for authentication by client device 104, and can encapsulate the detected request for authentication in a tunnel such as an SSL tunnel to cloud-based service application 106. One or more of cloud-based service application 106, cloud-based identity provider 108 or cloud-based configuration controller 120, can then associate the source of the tunnel (network gateway 110) with the request for authentication (originated by user 102) encapsulated in the tunnel. A request for configuration for network gateway 110 can be included with the encapsulated request for authentication.

Configuration receiver module 306 operates to receive configuration from a cloud-based configuration controller. According to an implementation, in response to a request from configuration requester module 304, cloud-based configuration controller 120 sends configuration for network gateway 110. The configuration receiver module 306 may establish a secure path between network gateway 110 and cloud-based configuration controller 120 in order to receive configuration.

Gateway configuration module 308 operates to configure the network gateway. The configurations or configuration instructions received from cloud-based configuration controller 120 are implemented on network gateway 110 by gateway configuration module 308. According to an implementation, as described above, configurations implemented on network gateway 110 includes the configuration of the pseudo-anonymous identifier 124 as an owner and/or controlling user of network gateway 110.

Operational status module 310 operates to determine and manage the operational status of the network gateway. Operational status module 310, for example, can manage an operational status of network gateway 110 that can be in one of the states "configuration required" (also referred to as "learning mode" or "adaptive mode") or "configuration complete." If, for example, ownership of the network gateway is not configured, then operational status module 310 may manage an operational status of network gateway 110 as "configuration required."

Network module 312 operates to provide network capabilities to network gateway 110. Network capabilities can include, but are not limited to, implementing of network interfaces such as an interface to home network 112 and an interface to network 116 to link to an external network. Network capabilities can further include address assignment such as a DHCP server, SSL or other tunnel encoding/decoding, network address translation, and the like.

Figure 4:
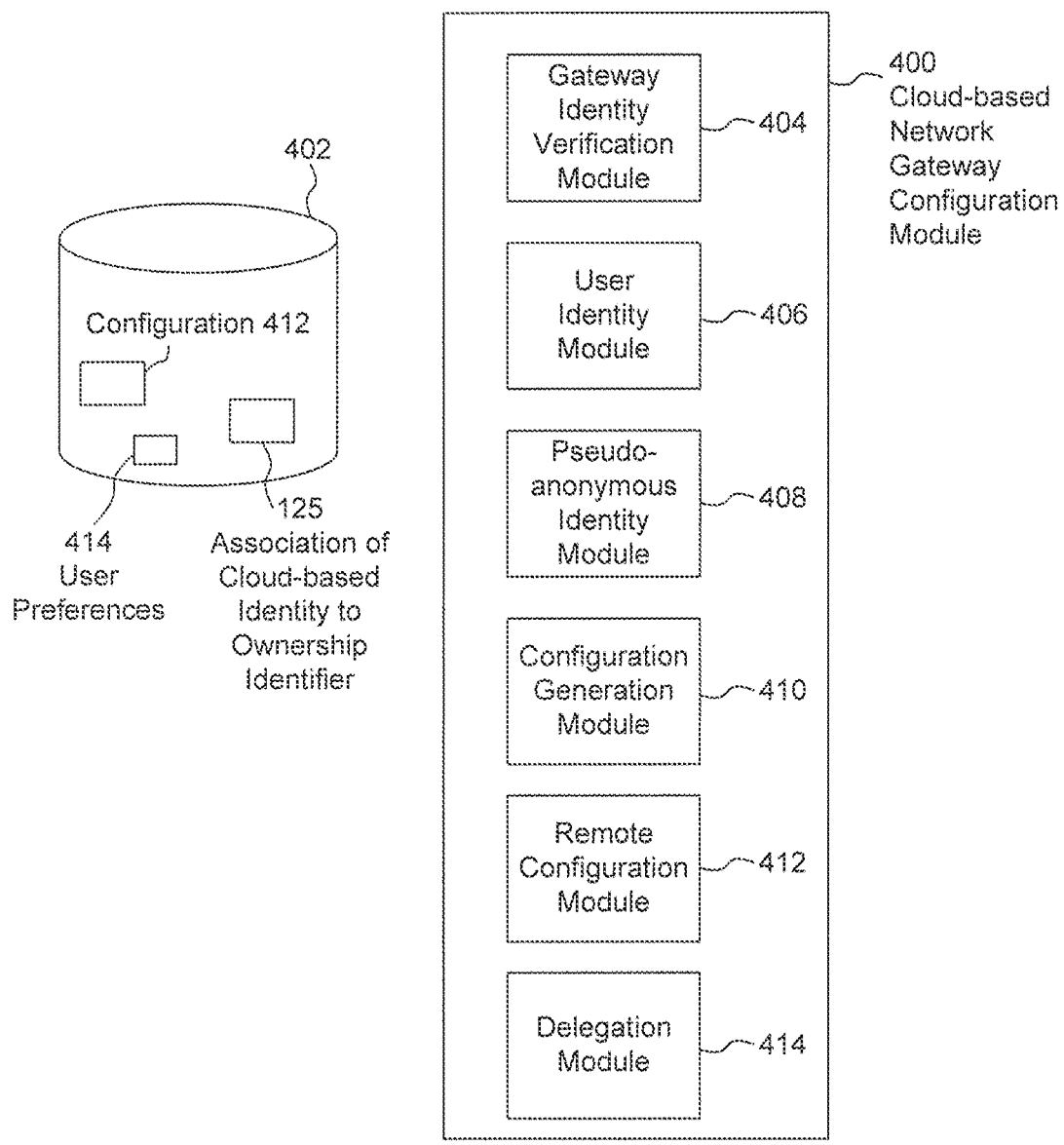
FIG. 4 illustrates a cloud-based configuration controller in accordance with an implementation.

FIG. 4 illustrates a cloud-based network gateway configuration module 400 in accordance with an implementation. Module 400 can be implemented, for example, in cloud-based configuration controller 120 in order to provide configuration to network devices such as network device 110. According to another implementation, module 400 is implemented in a combination of cloud-based configuration controller 120, cloud-based identity provider 108, and cloud-based service application 106. Module 400 includes a configuration database 402, a gateway identity verification module 404, a user identity module 406, a pseudo-anonymous identity module 408, and a configuration generation module 410.

Configuration database 402 comprises stored information including configuration information 412 for network gateways such as network gateway 110. Configuration information 412 may include a configuration profile and/or configuration instructions for configuring network gateway 110. Configuration database 402 also includes user associations, such as associations 125, that define a binding between a user's cloud-based identity and an ownership identity with which one or more network gateways 110 have been configured.

Gateway identity verification module 404 operates to determine the identity of the network gateway 110 that is to be configured. Network gateway 110 can be uniquely identified by its IP address such as the public IP address used to represent it to remote networks. When a configuration request associating a user 102 or client 104 with network device 110 is received at cloud-based configuration controller 120, gateway identity verification module 404 may operate to verify that the user and/or client are actually associated with the network device. According to an implementation, verification can be based upon comparing the source address in the configuration request with the source address used by client 104 in authenticating with a cloud-based service application 106.

User identity module 406 operates to determine a cloud-based identity for a user, such as user 102, for whom the ownership privileges of network gateway 110 are to be configured. According to an implementation, user identity module 406 determines a user's cloud-based identity based upon one or more credentials of the user which are obtained by network gateway 110. According to another implementation, the user's cloud-based identity is determined using information that only indirectly relates to the user. For example, user identity module 406 may use the public IP address of a network gateway to determine, through a cloud-based service application 106 and/or cloud-based identity provider 108, a cloud-based identity of user 102 who accesses cloud-based service application 106 using the same public IP address as the source.

Pseudo-anonymous identity module 408 operates to create and manage an ownership identity which is to be configured in network gateways such as network gateway 110. The ownership identity is the identity of the owner as known to, and/or as stored on, network gateway 110. According to an implementation, the ownership identity is pseudo-anonymous, wherein there is no information in the ownership identity using which actual identity of the user can be determined. According to an implementation, the cloud-based identity of a user is related to ownership identity only through an association 125.

Configuration generation module 410 operates to generate the configuration that is to be implemented in network gateway 110. According to an implementation, the generated configuration is based upon characteristics of network gateway 110 and preferences of user 102. User configuration preferences 414 may be obtained and stored by cloud-based configuration module 120 and respective cloud-based identifiers can be associated with the stored preferences 414. These preferences may also be referred to as configuration profiles.

The various logic modules illustrated in FIGS. 1-4 can be implemented in software, firmware, hardware, or a combination thereof. In an implementation, one or more of the modules are implemented in the C++, C, and Java programming languages. In one implementation, a computer program product may have logic including the computer program logic of the modules recorded on a computer readable medium such as a hard disk, flash disk, or other form of storage medium. According to an implementation, the modules implemented in software execute on processor 202 and utilize volatile memory 204 for temporary storage of data and instructions. Persistent memory 206 may be used for additional temporary storage during the execution of the modules.

Figure 5:
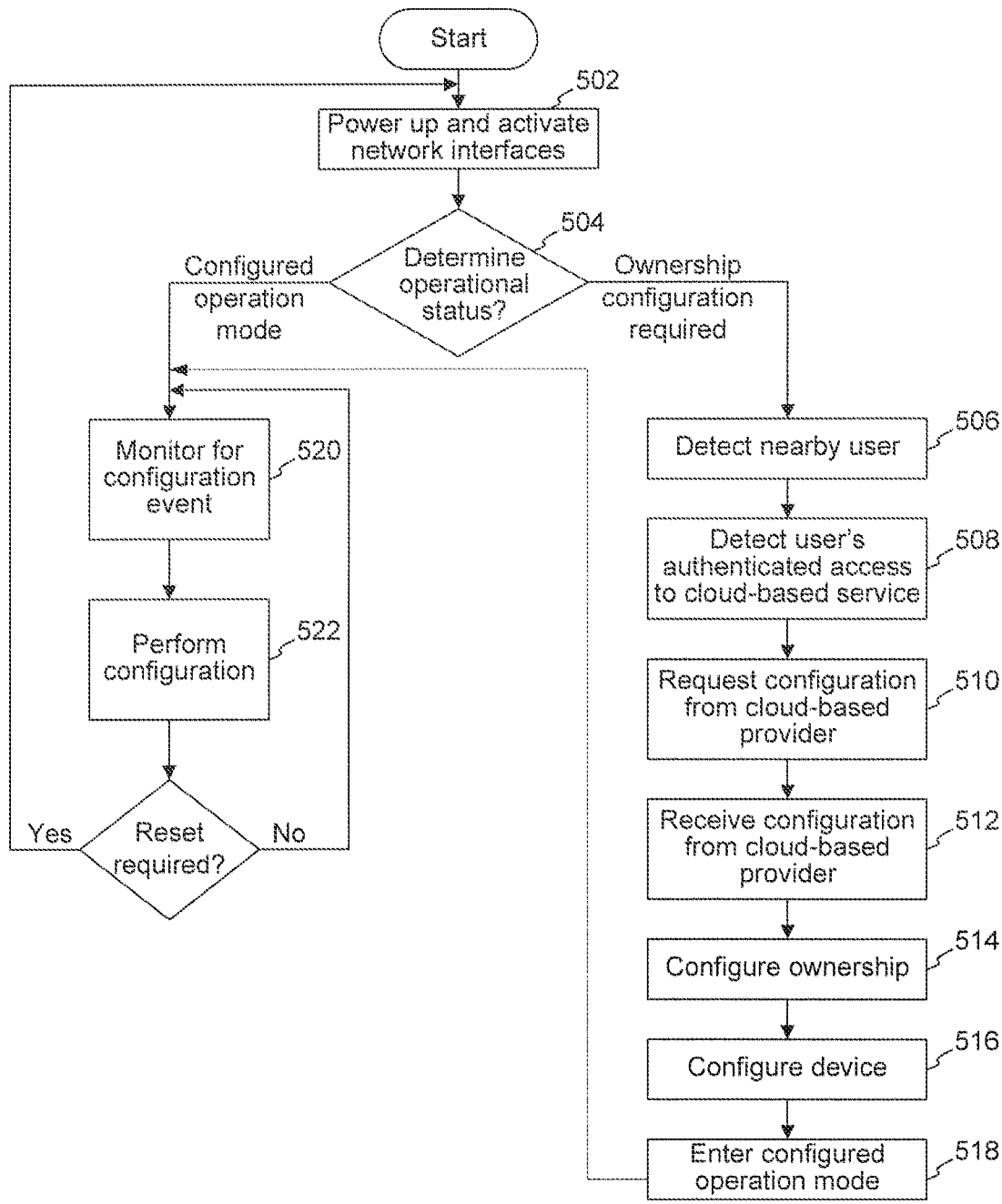
FIG. 5 illustrates a flowchart of a method of configuring a network device in accordance with an implementation.

FIG. 5 illustrates a method 500 for configuring a network gateway in accordance with an implementation. Method 500 may not occur in the order shown, or require all of the steps. Method 500 can be performed, for example, in network gateway 110 by adaptive configuration module 300. Method 500 can be used to automatically associate a nearby user with a network gateway requiring configuration and to configure the network gateway to provide controlling user privileges to the associated nearby user.

In step 502, a network gateway is powered up. According to an implementation, network gateway 110 may be powered up for the first time by a user 102 in a home environment. As shown in FIG. 1, network gateway 110 includes interfaces to local network 114 and an interface to remote network 116. Upon powering up, network gateway 110 may not have access to user configurations and may not have an owner (or other controlling user) configured. Upon powering up, network gateway can initialize its network interfaces according to a default configuration. The user who powers up gateway 102, who may be user 102, may perform some a portion of the configuring of the interfaces to the local and remote networks so that network connectivity can be established, for example, based upon a default configuration.

Initially, the network connectivity may be restricted to access only remote network locations that are listed in a configured list stored in network gateway 110. Network connectivity according to the default configuration can also be restricted to users who are within a predetermined distance from the network gateway 110. For example, only users who are associated with a client that is within a predetermined distance as determined by a Bluetooth connection or WIFI connection may be allowed to access a network via network gateway 110 when it is operating in the default configuration.

According to another implementation, a nearby user may indicate by some method such as, but not limited to, by depressing a reset switch on the network gateway for a predetermined length of time, that new ownership configuration is required. For example, when physical ownership of the network gateway changes from a first user to a second user, the second user may indicate that an ownership change is required.

In step 504, an operational status of the network gateway is determined. The operational status can be determined by checking the value of an ownership configuration parameter 124 which is stored in the network gateway 110. The operational status of network gateway 110 can also be determined by querying a configuration controller 120. Configuration controller 120 may be in a remote network 118 separate from the network in which the network gateway 110 is located. According to another implementation, configuration status is determined based upon configuration values, such as the ownership configuration parameters, stored locally in the network gateway. For example, if the ownership configuration parameter does not have a valid value or indicates that no ownership has been configured, then it is determined that ownership configuration is required.

If, in step 504, it is determined that ownership configuration is required, then method 500 proceeds to step 506. In step 506, a nearby user is detected. According to an implementation, a client device 104 is detected as being connected to a local network 114 of network gateway 110. Client 104 may be detected on the basis of its detection by network gateway 110 as a nearby device with a Bluetooth interface. Client 104 may also be detected when it forms a link layer association with a WIFI access point in network gateway 110. Yet another method of detecting a nearby user can be based upon the packets or frames that are detected on a local wired network. Another method for detecting a nearby client 104 at a network gateway 110 can be based upon an address allocator (e.g. DHCP server) for local network 114 being located in gateway 110.

After step 506, method 500 proceeds to step 508 in which an access by the nearby user to a cloud-based service application is detected. The network gateway can monitor packets and/or connections that are forwarded through it to detect traffic (e.g., packets and/or connections) that are to a destination IP address or to a destination URL that is listed in a preconfigured list of destinations. Therefore, the traffic through the network gateway can be monitored for packets between a nearby user or the client through which the nearby user is connected to the local network and a remote destination which is listed in a preconfigured list.

The network gateway may detect a login or other authentication of the nearby user by a cloud-based service application to which the nearby user connects through the network gateway. An authentication of the nearby user may be detected based upon detected message exchanges, such as, HTTP authentication required and response messages. According to another implementation, the setting up of an SSL connection from the client of the nearby user to a selected destination is considered an authentication of the nearby user. According to yet another implementation, a proxy server may be implemented in the network gateway. The proxy server would intercept messages between the user and the cloud-based service application, and perform any changes required for addressing etc. The proxy server may be used in detecting authentication requests and responses.

In step 510, the network gateway requests configuration from a cloud-based configuration controller. The request comprises an identification of the network gateway and an indication of the authentication connection made by the user who may be associated with the network gateway as its owner. The identification of the network gateway may include a public IP address of the network gateway. The identification of the network gateway may also include an identifier such as the serial number.

The indication of the authentication connection may include information that can be used by a cloud-based entity to directly or indirectly relate the user to a cloud-based identity. Example indications of the user can include one or more user credentials such as a username and/or password, or a public key (e.g., public PKI key) of the user.

According to some implementations, the indication of the authentication connection may be some information that indirectly relates to the user. For example, the public IP address of the network gateway can be considered as an indication of the authentication connection for the user who has connected to a cloud-based service application through network gateway. The information included in the configuration request can be used by cloud-based configuration controller and other cloud-based services to associate an authenticated user with the network gateway by establishing that the network gateway is an intermediary in the trusted path between the user and an authenticated cloud-based service.

According to an implementation, if the new association which is formed relating the ownership configuration to the user is replacing a previously existing ownership association (i.e., if the ownership of the network gateway is being reconfigured), then an email or text message may be automatically transmitted to the previous owner based upon his cloud-based identity determined from the recently replaced association.

In step 512, in response to its configuration request, the network gateway receives configuration from the cloud-based configuration controller. The received configuration may be in the form of one or more instructions to be executed in the network gateway, or in the form of a binary executable that can be loaded in the network gateway. The received configuration includes ownership configuration for the network gateway. The received configuration can also include configurations for other configuration parameters. Exemplary configuration parameters include status and operational parameters of respective network interfaces. The configuration may be received over a secure communications path established between the cloud-based configuration controller and the network gateway. For example, a secure communications path may be established by the configuration controller encrypting the configuration using the public key of the network gateway, and the network gateway decrypting the encrypted configuration using its private key which is configured in the device at the time of manufacture.

In step 514, one or more ownership configuration parameters in the network gateway are configured. The one or more ownership configuration parameters are configured to give effect to the ownership configuration specified in the configuration received from the cloud-based configuration controller. According to an implementation, the ownership configuration parameters in the network gateway can be set to a pseudo-anonymous ownership identifier that is specified by the cloud-based configuration controller. According to an implementation, no information that can directly identify the user is provided from the cloud-based configuration controller to network gateway. In implementations where a pseudo-anonymous ownership identifier is used the association between the ownership identifier and the user's cloud-based identity is maintained at the cloud-based configuration controller and not sent or downloaded to the network gateway.

In step 516, further configuration of the network gateway may be performed. For example, the cloud-based configuration controller may have provided a configuration profile or other configuration instructions to configure the network gateway according to predetermined user preferences. In some implementations, such a configuration profile or instructions can be implemented after the ownership has been configured for the network gateway.

In step 518, having completed the ownership configuration in step 514 and optionally any further configuration in step 516, the network gateway can set its operational mode to indicate having completed configuration. After the step 518, method 500 proceeds to step 520 in which the network gateway operates in a configured mode and monitors for incoming configuration events. Step 520 is also reached from step 504.

If, in step 504, it is determined that the network gateway is operating in a configured mode, method 500 proceeds to step 520. As described above, when the network gateway already has its ownership configured it operates in configured mode. In step 520, the network gateway monitors for incoming configuration events. A configuration event can be received from the cloud-based configuration controller to reconfigure the network gateway. According to another implementation, a configuration event can also be received through a local network interface.

In step 522, a configuration event is received to change one or more configuration parameters in the network gateway, and the reconfiguration instructions are implemented.

In step 524, it is determined is a reset of the network gateway is required. The determination can be based upon the type of reconfiguration performed. The addition or deletion of user privileges, changing network interface parameters, and the like may not require a reset. Re-initialization of all configuration parameters, implementing software changes, and the like, may require a reset. If it is determined that a reset is required, method 500 proceeds to step 502. If no reset is required, method 500 proceeds to step 520.

Figure 6:
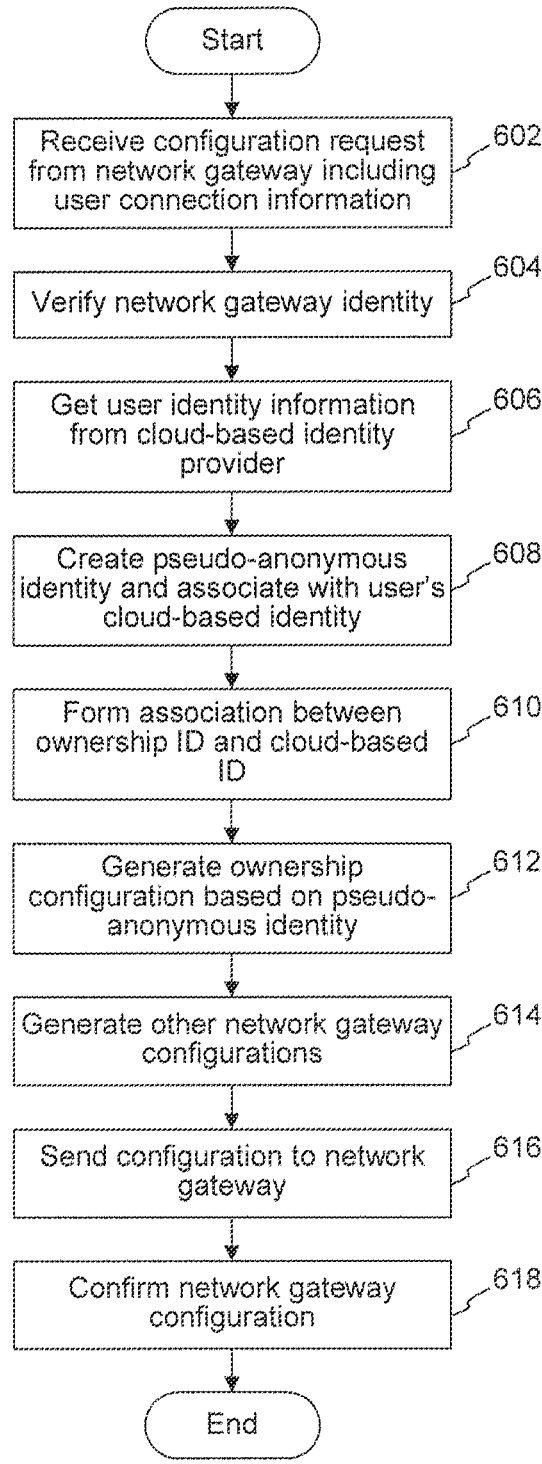
FIG. 6 illustrates a flowchart of a method 600 of providing adaptive ownership and cloud-based configuration and control of a network device in accordance with an implementation.

FIG. 6 illustrates a flowchart of a method 600 of providing adaptive ownership and cloud-based configuration and control of a network gateway in accordance with an implementation. Method 600 may not occur in the order shown, or require all of the steps. Method 600 can be performed by a cloud-based configuration controller 120 to configure and control a network gateway 110.

In step 602, a configuration request is received from the network gateway requesting configuration. As described above, the configuration request includes an identification of the network gateway, for example, in the form of a public IP address. The identification of the network gateway can also include other information such as the serial number of the network gateway and/or the type of network gateway.

The configuration request also includes an indication of a nearby user. The nearby user can be a user who is connected to the network gateway through one of the gateway's local network interfaces. The nearby user may be selected by the network gateway based on a communication between the nearby user (or a client through which the nearby user is connected to the network gateway) and a cloud-based service application via the network gateway. For example, the nearby user may be the first user that sets up a connection, through the network gateway, to the cloud-based service application.

In step 604, the identity of the network gateway can be verified. The verification can be based upon checking that any IP address provided as the IP address of the network gateway is reachable and not in a disallowed list. If a gateway identifier, such as, a serial number of the network gateway or a cryptographic token is provided, the verification can also include checks to ensure that the serial number is valid. Similar checks can be performed to ensure that the type of the network gateway is supported by the cloud-based configuration controller.

In step 606, the cloud-based identity corresponding to the nearby user information provided in the configuration request is determined. How the cloud-based identity is determined can differ based upon the indication of the nearby user that is included in the configuration request. The cloud-based configuration controller uses one or more of the indications of the user provided in the configuration request to determine a cloud-based identity associated with the user.

If one or more user credentials, such as login username, is provided in the configuration request, the cloud-based configuration controller uses the provided one or more credentials to query a cloud-based service application and/or cloud-based identity provider in order to obtain the user's cloud-based identity. When queried with the one or more credentials, the cloud-based service application and/or cloud-based identity provider can check that an authentication was made for the credentials. In some implementations, the cloud-based service application and/or cloud-based identity provider can also check that the authentication was made to the credentials arriving from a particular IP address (e.g., the public IP address of the network gateway, which may be the source of the request to authenticate).

If the configuration request does not include a credential of a user, then an indirect indication of the user is used by the configuration controller to query the cloud-based service application and/or cloud-based identity provider in order to obtain a cloud-based identity. For example, when queried with an IP address of the network gateway (e.g., public IP address of the network gateway), the cloud-based service application and/or cloud-based identity provider can be configured to determine the authentications performed based on requests from that IP address. The most recent of authentications provided for in response to a request from that IP address can be considered to be associated with the user located nearby the network gateway. Thus, the cloud-based service application and/or cloud-based identity provider can return the cloud-based identity based upon an indirect indication of the user such as the public IP address of the network gateway.

In step 608, an ownership identifier for the network device is generated. In another implementation, the ownership identifier may be provided by the network gateway, for example, by including it in the configuration request. In some implementations, the ownership identifier is a pseudo-anonymous identifier. When generated as a pseudo-anonymous identifier, there is nothing in the ownership identifier with which the user can be directly identified. In an implementation, the ownership identifier may be a randomly generated number. In another implementation, the ownership identifier may include an encrypted specification of the user.

In step 610, an association is formed between the generated ownership identifier and the cloud-based identity of the user. The association may be formed by linking the ownership identifier to the user's cloud-based identity. The linking may be based upon a technique, such as, using a pointer or by organizing in a lookup table.

In step 612, one or more instructions are formed to configure ownership of the network gateway. The ownership of the network gateway can be configured to be set to the ownership identifier. According to another implementation, a configuration profile may be created and/or modified to set the ownership configuration parameter to the determined value of the ownership identifier.

In step 614, additional configurations to be performed can be identified and instructions for performing any such configurations can be generated or a configuration profile can be modified to perform the additional configurations. The additional configurations may be with respect to network interfaces, traffic and/or access logging functions, or any other configurable function performed by the network gateway. The additional configurations may pertain to user preferences associated with the cloud-based identity associated with the ownership identifier.

In step 616, the cloud-based configuration controller transmits the one or more configuration instructions and/or the configuration profile to the network gateway, in order to cause the network gateway to reconfigure itself based upon the transmitted one or more configuration instructions and/or the configuration profile. The transmission of the configuration instructions and/or profile may be encrypted and/or in a secure tunnel formed between the network gateway and the configuration controller. The encryption and/or the secure tunnel can be implemented using one of many techniques. According to an implementation, the cloud-based configuration controller encrypts the configuration being sent to the network gateway. The encryption may be based on a preconfigured key or a public key associated with the network gateway device.

In step 618, the network gateway configuration can be confirmed by the cloud-based configuration controller. For example, a message may be received from the network gateway indicating the configuration status. If the configuration is successful method 600 ends. If the configuration is unsuccessful, the configuration controller may optionally retry the transmission of the configuration instructions and/or configuration profile (not shown).

Figure 7:
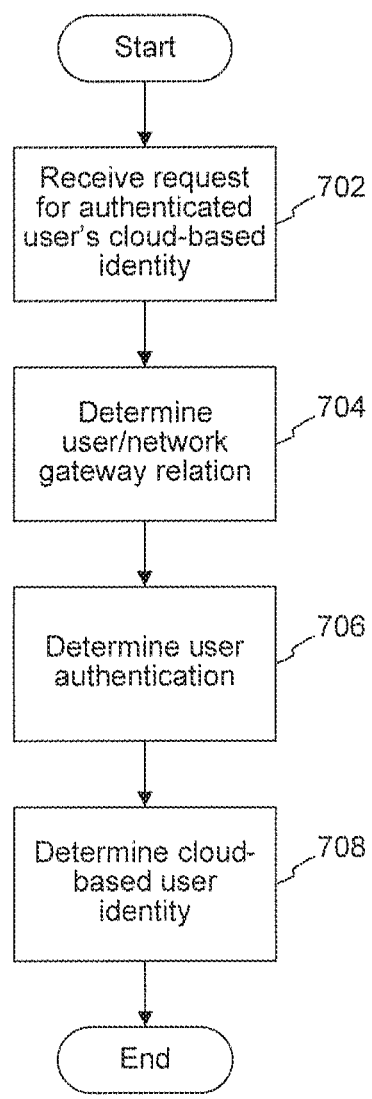
FIG. 7 illustrates a flowchart of a method of determining an authenticated cloud-based identity for a user in accordance with an implementation.

FIG. 7 illustrates a flowchart of a method 700 (steps 702-708) of determining an authenticated cloud-based identity for a user in accordance with an implementation. Method 700 may not occur in the order shown, or require all of the steps. According to an implementation, method 700 can be implemented by one or more of cloud-based service application 106, cloud-based identity provider 108 and cloud-based configuration controller 120 illustrated in FIG. 1.

In step 702, a request for an authenticated cloud-based identity of a user is received. According to an implementation, cloud-based configuration controller 120, upon receiving a configuration request from network gateway 110, requests for an authenticated cloud-based identity of a user from a cloud-based service application 106 or cloud-based identity provider 108. According to another implementation, the network gateway can make the request for the user's authenticated cloud-based identity from one or more of cloud-based service application 106, cloud-based identity provider 108 and cloud-based configuration controller 120. The request may include a user credential such as a user name.

In step 704, it is determined whether the network gateway (i.e., the network gateway that is to be configured) is an intermediary for the user (i.e., the user for whom the ownership of the network gateway is to be configured). The intermediary relationship between the user and the network gateway can be determined based upon detecting that the public IP address of the network gateway is the same as the public IP address from which the authentication of the user was requested.

In step 706, an authentication of the user is determined. According to an implementation, one or more credentials of the user (e.g., username, password, public key, and shared key) or other indicator of the user such as an IP address from which the user would have logged in, is used to locate a previously performed authentication of the user. The authentication of the user, for example, may have occurred when the user accessed a cloud-based service application.

In step 708, the cloud-based identity of the user is determined. The determined cloud-based identity is found based upon a detected successful authentication of the user. The determined cloud-based identity of the user is considered an authenticated cloud-based identity because, for example, it is found based upon a detected authentication of the user.

Figure 8:
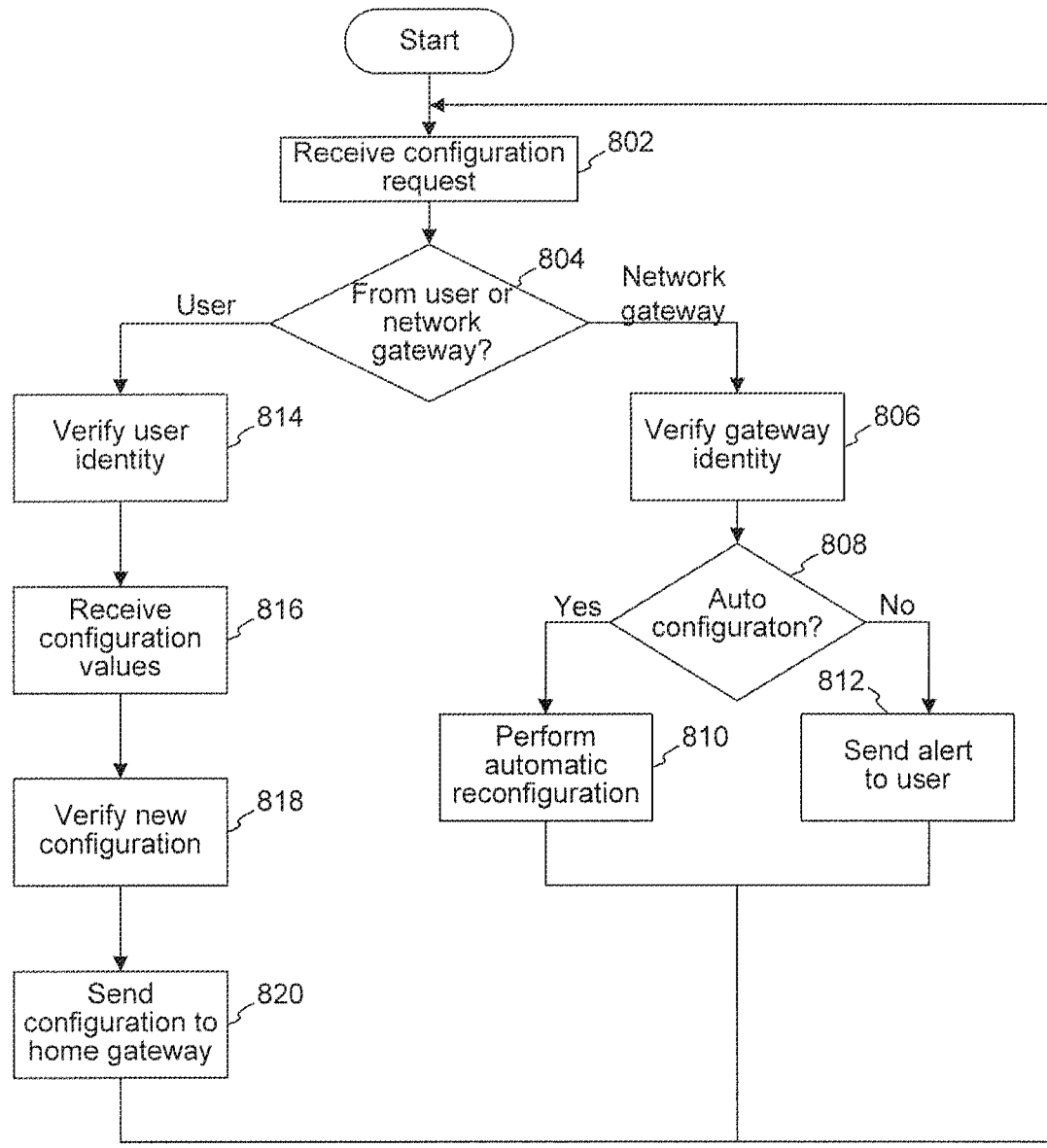
FIG. 8 illustrates a flowchart of a method of configuring a network device through a cloud-based configuration controller in accordance with an implementation.

FIG. 8 illustrates a flowchart of a method 800 (steps 802-820) of configuring a network gateway through a cloud-based configuration controller in accordance with an implementation. Method 800 may not occur in the order shown, or require all of the steps. According to an implementation, method 800 is used to configure network gateway 110 subsequent to its initial configuration of ownership. An exemplary, initial configuration of ownership was described above in relation to FIG. 5.

In step 802 a cloud-based configuration controller, such as cloud-based configuration controller 120, receives a configuration request. The configuration request indicates that the network gateway requires an update to its current configuration.

In step 804, it is determined whether the request was sent by a user or by the network gateway.

If, as determined in step 804, the request is from the network gateway, then method 800 proceeds to step 806. In step 806, the identity of the network gateway can be verified.

In step 808, it is determined whether the requested configuration can be accomplished without user intervention. For example, a request for a refresh of one or more configuration parameters can be performed without user intervention by transmitting one more configuration instructions already available at the cloud-based configuration controller.

If, in step 808, it is determined that no user intervention is required, then in step 810, the one or more instructions to perform the requested configuration of the network gateway are formed and transmitted to the network gateway in order for it to be reconfigured accordingly.

If, in step 808, it is determined that user intervention is required, then in step 812, the user is alerted. An exemplary method of alert may be to transmit an email message or a text message to an address associated with the cloud-based identity of the user. The user may then login to the network gateway or an interface (e.g., a web-based interface) provided by cloud-based configuration controller 120 to configure and/or control the network gateway. The user may log in to the network gateway using the same credentials (e.g., password, username) that he uses to login to one or more cloud-based service applications, such as cloud-based service application 106. By enabling the user to login through a web-based interface provided by cloud-based configuration controller 120 and by authenticating the login based upon the cloud-based identity of the user, a convenient method is provided for user 102 to remotely perform authenticated access, configuration, and monitoring of the network gateway 110. User login to configure the network gateway is further described below with respect to step 814.

If, in step 804, it is determined that the request for configuration was received from a user, then method 800 proceeds to step 814. The configuration request may be received from a user, for example, when a user attempts to reconfigure the network device by logging into the device locally or through a cloud-based configuration controller.

In step 814, the user is authenticated. According to an implementation, the user can use the same credentials that are used for cloud-based service applications. The cloud-based configuration controller authenticates the user and finds the current configuration that is associated with the network gateway and the authenticated cloud-based identity of the user.

In step 816, configuration information and/or changes to current configurations are received from the user. According to an implementation, the user may be presented with a user interface in which to make any changes to the current configurations.

In step 818, the configuration requested by the user can be verified. For example, the new configuration can be verified by comparing to various standard configurations in order to reduce the risk of misconfiguration.

In step 820, one or more configuration instructions and/or a configuration profile to effect the requested changes are formed, and transmitted to the network gateway. As described above, the configuration may be securely transmitted from the cloud-based configuration controller to the network gateway.

Figure 9A:
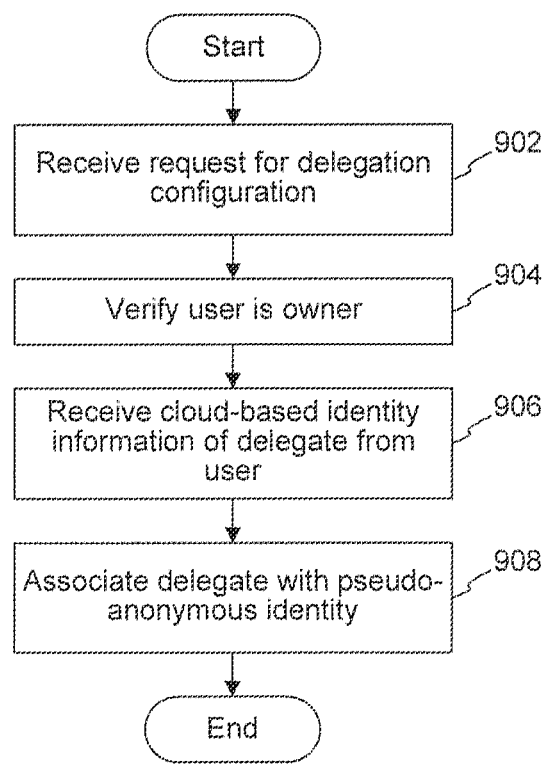
FIG. 9A illustrates a flowchart of a method of delegating control of a network device in accordance with an implementation.

FIG. 9A illustrates a flowchart of a method 900 of delegating control of a network gateway in accordance with an implementation. Method 900 may not occur in the order shown, or require all of the steps. According to an implementation, method 900 can be performed by cloud-based configuration controller 120 to change configuration affecting network gateway 110. Specifically, according to an implementation, control of network gateway 110 may be delegated from user 102 to a delegate using method 900.

In step 902, the cloud-based configuration controller 120 receives a request for delegation of control for network gateway 110. The request may be originated by user 102 who is currently configured as the owner of network gateway 110.

In step 904, cloud-based configuration controller 120 may verify that the request is from the current owner of the network gateway. The verification may be performed by authenticating the user (i.e., originator of the request to delegate) in order to determine the user's authenticated cloud-based identity. As described above, an association relating the cloud-based identity of the user with the ownership identity of the network gateway may be previously determined and stored in the cloud-based configuration controller.

In step 906, a delegation command is received from the user. According to an implementation, the user specifies a cloud-based identity of the delegate to whom controlling user privileges are to be delegated. An email message or text message notifying of the delegation can be transmitted to the delegate.

In step 908, the stored association of the ownership identity of the network gateway is updated to relate the ownership identity to the delegate's cloud-based identity as a delegate.

According to an implementation, a new association depicting the relating of the delegate's cloud-based identity to the network gateway's ownership identity may be added and linked to the association related to the user's cloud-based identity. Such links may be interpreted by processing logic, such as processing logic of cloud-based configuration controller 120, as a chain of delegation. In an exemplary implementation, the ownership may be retained by user 102 based upon the original ownership configuration performed at the time the network gateway was powered on, and user 102 may delegate control of the network gateway to one or more other users (i.e. delegates).

Figure 9B:
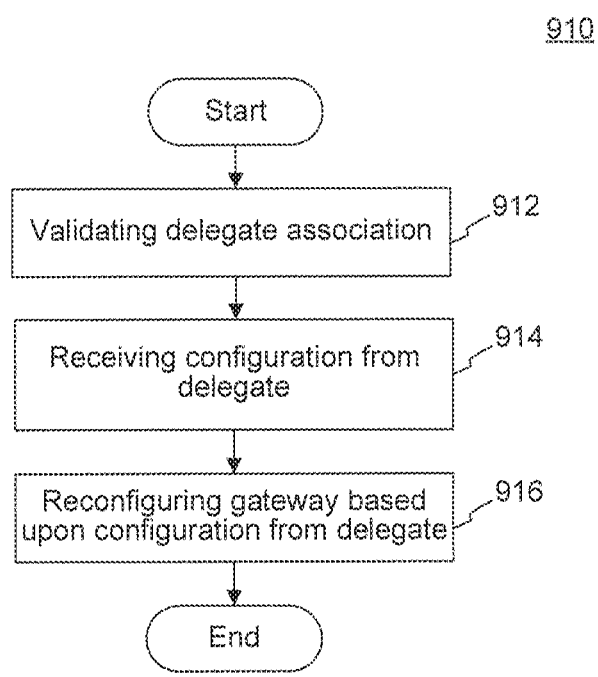
FIG. 9B illustrates a flowchart of a method for a delegate to reconfigure a network device in accordance with an implementation.

FIG. 9B illustrates a flowchart of a method 910 for a delegated user to configure a network gateway in accordance with an implementation. Method 910 may not occur in the order shown, or require all of the steps. According to an implementation, method 910 can be performed by cloud-based configuration controller 120 to change configuration affecting network gateway 110.

In step 912, the updated association is validated. When, for example, the delegate attempts to perform configuration changes upon the network gateway by logging in, the delegate's login credentials are used to authenticate the delegate's cloud-based identity. Upon authentication of the delegate's cloud-based identity, the updated association can be considered as validated and the delegate can be allowed to perform configuration of the network gateway.

In step 914, changes from the delegate to the current configuration of the network gateway are received. The delegate may make changes to the configuration using a web-based user interface implemented by the cloud-based configuration controller.

In step 916, the network gateway is reconfigured based upon the changes to the configuration made by the delegate. The reconfiguration may include a reconfiguration of the configuration settings for the network gateway maintained in the cloud, and also the reconfiguration of the actual network gateway. According to an implementation, the reconfiguration of the configuration settings for the network gateway maintained in the cloud and the reconfiguration of the actual network gateway may be decoupled in time. For example, according to an implementation, the configuration settings in the cloud may be changed by the delegate at any time, and the network gateway may, at a later time, download the changed configuration to reconfigure accordingly.

The implementations have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific implementations will so fully reveal the general nature of the invention that others can, by applying knowledge within the skill of the art, readily modify and/or adapt for various applications such specific implementations, without undue experimentation, without departing from the general concept of the present invention. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described illustrative implementations, but should be defined only in accordance with the following claims and their equivalents.

What is claimed is:

1. A system for configuring a network device, comprising:
a cloud-based configuration controller including:
  a processor;
  a configuration request receiving module executed by the processor and configured to receive a configuration request from the network device, the configuration request including access information pertaining to an access made by a user to a cloud-based service;
  a user identity module executed by the processor and configured to determine a cloud-based identity of the user based upon the received access information;
  a pseudo-anonymous identity module executed by the processor and configured to associate the cloud-based identity with an ownership identifier;
  a configuration generation module executed by the processor and configured to form one or more instructions to configure the network device with the ownership identifier as an owner of the network device and to configure one or more parameters of a network interface of the network device; and
  a transmission module executed by the processor and configured to transmit the one or more instructions to the network device if a first unique stream identifier comprising an Internet Protocol address and port and associated with a request for authentication of the user matches a unique second stream identifier comprising an Internet Protocol address and port and associated with the configuration request.

2. The system of claim 1, wherein the ownership identifier does not include information that can identify the user.

3. The system of claim 1, wherein the received access information includes one or more login credentials associated with the user, and wherein the one or more login credentials are used to successfully authenticate a client device associated with the user to the cloud-based service.

4. The system of claim 3, wherein the user identity module executed by the processor is configured to determine the cloud-based identity by:
   determining that the client device associated with the user accessed the cloud-based service through the network device; and
   obtaining the cloud-based identity from a cloud-based identity provider associated with the cloud-based service.

5. The system of claim 1, wherein the formation of the one or more instructions includes the configuration of the one or more instructions to grant controlling user access privileges to a client device associated with the user.

6. The system of claim 1, wherein the one or more instructions to set one or more operating parameters of the network device configure the network device according to a configuration profile associated with the cloud-based identity.

7. The system of claim 1, further comprising a delegation module executed by the processor and configured to:
   receive, at the cloud-based configuration controller, a request from the user to delegate control of the network device to a second user;
   confirm that the user is at present associated with the ownership identity;
   responsive to the confirmation, determine a second authenticated cloud-based identity, wherein the second authenticated cloud-based identity corresponds to the second user; and
   responsive to the determination of the second authenticated cloud-based identity, delegate one or more control privileges of the network device to the second user.

8. A method of configuring a network device by a cloud-based configuration controller, the method comprising:
   receiving, by the cloud-based configuration controller, a configuration request from the network device, the configuration request including a first unique stream identifier comprising an Internet Protocol address and port, and access information pertaining to an access made by a user to a cloud-based service and including a second unique stream identifier comprising an Internet Protocol address and port, the cloud-based service being other than the cloud-based configuration controller;
   determining a cloud-based identity of the user based upon the received access information;
   associating the cloud-based identity with an ownership identifier;
   forming one or more instructions to configure the network device with the ownership identifier as an owner of the network device and to configure one or more parameters of a network interface of the network device; and
   transmitting the one or more instructions to the network device if the first unique stream identifier matches the second unique stream identifier.

9. The method of claim 8, wherein the ownership identifier does not include information that can identify the user.

10. The method of claim 8, wherein the received access information includes one or more login credentials associated with the user, and wherein the one or more login credentials are used to successfully authenticate a client device associated with the user to the cloud-based service.

11. The method of claim 10, wherein determining the cloud-based identity further comprises:
   determining that the client device associated with the user accessed the cloud-based service through the network device; and
   obtaining the cloud-based identity from a cloud-based identity provider associated with the cloud-based service.

12. The method of claim 8, wherein the forming the one or more instructions includes configuring the one or more instructions to grant controlling user access privileges to a client device associated with the user.

13. The method of claim 8, wherein the one or more instructions to set one or more operating parameters of the network device configure the network device according to a configuration profile associated with the cloud-based identity.

14. The method of claim 8, further comprising:
   receiving, at the cloud-based service, a request from a user to delegate control of the network device to a second user;
   confirming that the user is at present associated with the ownership identity;
   responsive to the confirming, determining a second authenticated cloud-based identity, wherein the second authenticated cloud-based identity corresponds to the second user; and
   responsive to the determining the second authenticated cloud-based identity, delegating one or more control privileges of the network device to the second user.

15. A non-transitory computer readable storage medium comprising instructions for a cloud-based configuration controller, the instructions executable by one or more processors to configure the cloud-based configuration controller to:
   receive a configuration request from a network device, the configuration request including access information pertaining to an access made by a user to a cloud-based service, the cloud-based service being other than the cloud-based configuration controller;
   determine a cloud-based identity of the user based upon the received access information;
   associate the cloud-based identity with an ownership identifier, the ownership identifier not including information that can identify the user;
   form one or more instructions to configure the network device with the ownership identifier as an owner of the network device and to configure one or more parameters of a network interface of the network device; and
   transmit the one or more instructions to the network device if a first unique stream identifier comprising an Internet Protocol address and port and associated with a request for authentication matches a second unique stream identifier comprising an Internet Protocol address and port and associated with the configuration request.

16. The non-transitory computer readable storage medium of claim 15, wherein the ownership identifier does not include information that can identify the user.

17. The non-transitory computer readable storage medium of claim 15, wherein the received access information includes one or more login credentials associated with the user, and wherein the one or more login credentials are used to successfully authenticate a client device associated with the user to the cloud-based service.

18. The non-transitory computer readable storage medium of claim 17, the instructions further executable to determine the cloud-based identity by:
   determining that the client device associated with the user accessed the cloud-based service through the network device; and
   obtaining the cloud-based identity from a cloud-based identity provider associated with the cloud-based service.

19. The non-transitory computer readable storage medium of claim 15, wherein the formation of the one or more instructions includes the configuration of the one or more instructions to grant controlling user access privileges to a client device associated with the user.

20. The non-transitory computer readable storage medium of claim 15, wherein the one or more instructions to set one or more operating parameters of the network device configure the network device according to a configuration profile associated with the cloud-based identity.

* * * * *